UNITED STATES PATENT OFFICE.

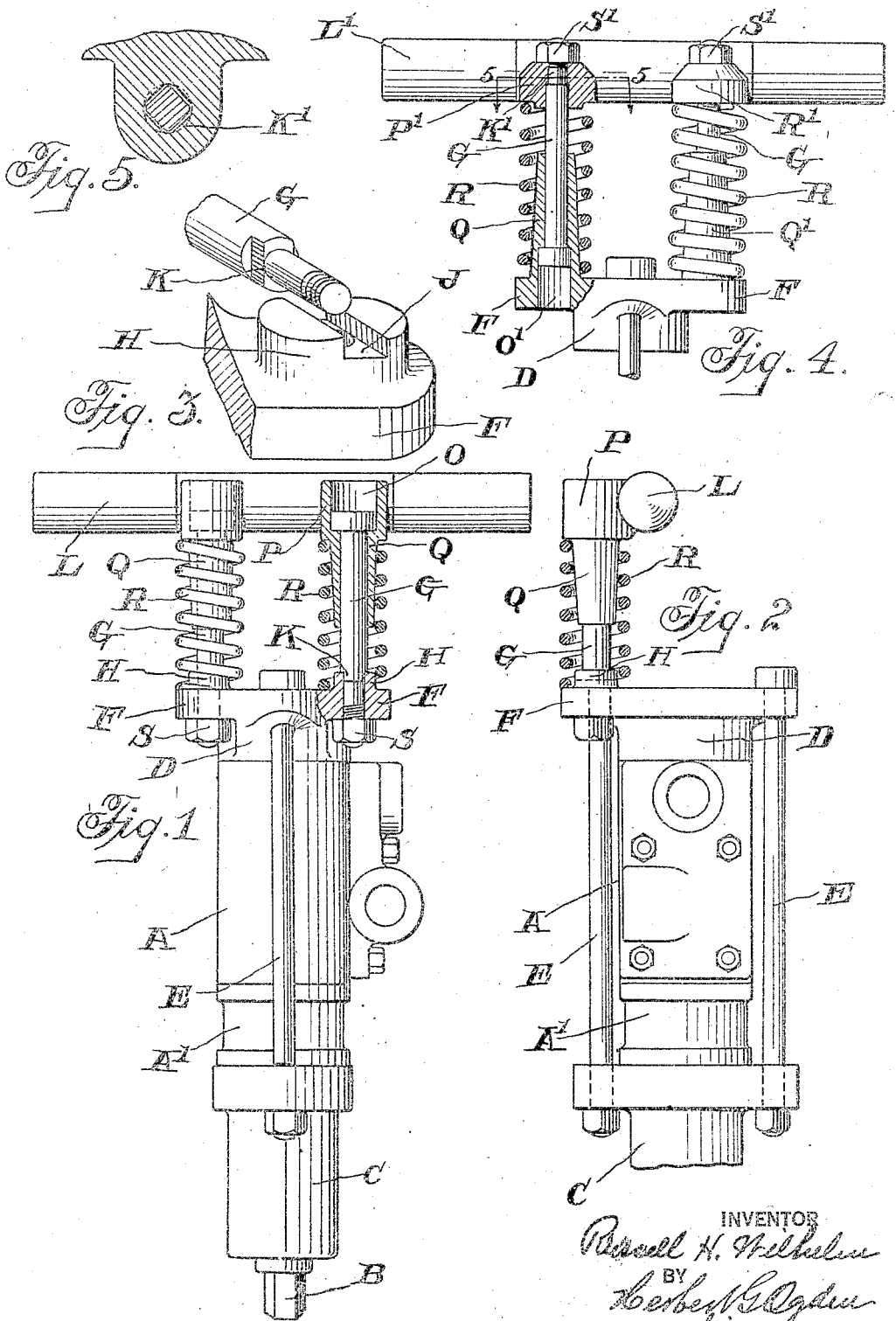

RUSSELL H. WILHELM, OF EASTON, PENNSYLVANIA, ASSIGNOR TO INGERSOLL-RAND COMPANY, OF JERSEY CITY, NEW JERSEY, A CORPORATION OF NEW JERSEY.

HANDLE FOR PERCUSSIVE TOOLS.

1,358,486.

Specification of Letters Patent.   Patented Nov. 9, 1920.

Application filed April 24, 1920. Serial No. 376,284.

*To all whom it may concern:*

Be it known that I, RUSSELL H. WILHELM, a citizen of the United States, residing at Easton, in the county of Northampton and State of Pennsylvania, have invented a certain new and useful Improvement in Handles for Percussive Tools, of which the following is a specification.

This invention relates to handles for hand held percussive tools, such as rock drills operated by fluid under pressure, and the primary object of the invention is to prevent the transmission of the shock and vibration of the tool to the handle, which renders the drilling less fatiguing for the operator.

Another object of the invention is to secure a simple but strong and durable handle bar construction which will withstand shock and hard usage without breaking.

To these and other ends which will hereinafter appear, the invention consists of the features of construction and combinations of elements described and claimed in this specification and shown in the accompanying drawings in which, Figure 1 is a side elevation partly in vertical section of a percussive tool having my improved handle affixed thereto, Fig. 2 is a side elevation of another side of the tool, looking at the end of the handle, Fig. 3 is an enlarged detail perspective view of one of the back head flanges and a bolt end, Fig. 4 is a detail side elevation partly in vertical section of a modified handle construction, and Fig. 5 is a detail horizontal sectional view on the line 5—5 of Fig. 4, looking in the direction of the arrows.

Referring to the drawings, Figs. 1 and 2 represent so much of a percussive tool as will serve to illustrate the invention. The tool is provided with the usual main cylinder casing A within which a piston (not shown) forming a hammer is adapted to reciprocate, actuated by fluid under pressure. The drill steel B is carried by the front head C, and the cylinder casing A, cylinder extension A', front head C, and back head D are held together by the usual side bolts E.

The back head D in this instance is provided with the flanges or lugs F and rearwardly extending handle supporting bolts G pass through the lugs F and are suitably held from both endwise and turning movement. In this instance bosses H are formed on the flanges F and provided with slots J in which the reduced portions K of the bolts G are seated thus preventing the bolts from turning.

The handle bar L shown in Figs. 1 and 2, is provided with the bolt head receiving sockets O in the bosses P, and sleeves Q, preferably in the form of integral extensions from the bosses P, are adapted to extend for a substantial distance over the bolts G and within compression springs R which tend to force the handle bar away from the back head. The sleeves Q serve the purpose of guiding the handle bar and springs as the handle bar slides on the bolts G.

In assembling the parts, the bolts and springs are placed in position on the handle bar, and the ends of the bolts are inserted in the flanges F and then tightened in position by means of the nuts S. In accordance with this construction the bolts are rigidly held on the back head D while the handle bar may slide on the bolts guided by the sleeves Q. The bosses H on the flanges F also serve to center and guide the ends of the springs adjacent the back head D. The bolt head receiving sockets O are of sufficient depth so that when the springs are compressed, a portion of the bolt heads still remains in the sockets and thus avoids the possibility of catching and injuring the operator's hands.

In the modification of the invention shown in Figs. 4 and 5, the back head D' is provided with the bolt holding flanges F' but the guiding sleeves Q' are in this instance formed integral with the flanges F'. The bolts G' are provided with the square necks K' held from turning within the bosses P' on the handle bar L' and the bolt heads are protected in the bolt head receiving sockets O'. In accordance with this modified construction shown in Figs. 4 and 5 the bolts are tightened by means of the nuts S' and are rigidly connected to the handle bar instead of to the back head.

In either form of the invention, the construction is durable and the bolts and guiding sleeves are not liable to break under shock and hard usage.

I claim—

1. In a percussive tool, a back head having bolt securing flanges, bolts passing through said flanges and extending rearwardly, a handle bar mounted on said bolts, compression springs around said bolts between the handle bar and back head, tending to force the handle bar away from the back head, sleeves around the bolts within the springs for guiding the handle bar and springs, and means for preventing the bolts from turning.

2. In a percussive tool, a back head having bolt securing flanges, bolts passing through said flanges and extending rearwardly, a handle bar slidably mounted on said bolts, compression springs around said bolts between the handle bar and back head, tending to force the handle bar away from the back head, sleeves connected to the handle bar and lying within the springs for guiding the handle bar and springs, and means for preventing the bolts from turning.

3. In a percussive tool, a back head having bolt securing flanges, rearwardly extending bolts passing through said flanges and rigidly secured thereto against endwise or rotary movement, a handle bar slidably mounted on said bolts, compression springs around said bolts between the handle bar and back head, tending to force the handle bar away from the back head, and sleeves connected to the handle bar and lying within the springs for guiding the handle bar and springs.

4. In a percussive tool, a back head having bolt securing flanges, bolts passing through said flanges and extending rearwardly, a handle bar mounted on said bolts, compression springs around said bolts between the handle bar and back head, tending to force the handle bar away from the back head, and protective sockets within which the bolt heads are adapted to slide.

5. In a percussive tool, a back head having bolt securing flanges, bolts passing through said flanges and extending rearwardly, a handle bar mounted on said bolts, compression springs around said bolts between the handle bar and back head, tending to force the handle bar away from the back head, protective sockets within which the bolt heads are adapted to slide, and means for preventing the bolt heads from moving beyond the sockets.

In testimony whereof, I have hereunto set my hand.

RUSSELL H. WILHELM.